US010469377B2

(12) United States Patent
LaVigne et al.

(10) Patent No.: US 10,469,377 B2
(45) Date of Patent: Nov. 5, 2019

(54) SERVICE INSERTION FORWARDING

(71) Applicant: HEWLETT PACKARD ENTERPRISE DEVELOPMENT LP, Houston, TX (US)

(72) Inventors: Bruce E. LaVigne, Roseville, CA (US); Shaun Wakumoto, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/532,618

(22) PCT Filed: Dec. 2, 2014

(86) PCT No.: PCT/US2014/068027
§ 371 (c)(1),
(2) Date: Jun. 2, 2017

(87) PCT Pub. No.: WO2016/089363
PCT Pub. Date: Jun. 9, 2016

(65) Prior Publication Data
US 2017/0346734 A1 Nov. 30, 2017

(51) Int. Cl.
H04L 12/28 (2006.01)
H04L 12/741 (2013.01)
H04L 12/64 (2006.01)
H04L 12/46 (2006.01)
H04L 29/12 (2006.01)

(52) U.S. Cl.
CPC .......... H04L 45/74 (2013.01); H04L 12/4633 (2013.01); H04L 12/6418 (2013.01); H04L 61/2007 (2013.01); H04L 61/6022 (2013.01)

(58) Field of Classification Search
CPC ....... H04L 45/74; H04L 69/22; H04L 45/745; H04L 12/4633; H04L 45/64
See application file for complete search history.

(56) References Cited

U.S. PATENT DOCUMENTS 7,965,636 B2  6/2011  Gooch et al.
8,045,550 B2  10/2011 LaVigne
(Continued)

OTHER PUBLICATIONS

Dong Lijun et al., "WBIPS: A Lightweight WTLS-Based Intrusion Prevention Scheme," Sep. 2007, pp. 2298-2301, IEEE.
(Continued)

Primary Examiner — Atique Ahmed
(74) Attorney, Agent, or Firm — Hewlett Packard Enterprise Patent Department

(57) ABSTRACT

Systems and methods associated with service insertion forwarding are disclosed. One example method includes building a service insertion address table. The service insertion address table may associate service insertion tunnels with device addresses based on payload source addresses retrieved from packets received via the service insertion tunnels. The method also includes forwarding a packet received from a source device to a destination device. The packet may be received from the source device via a source service insertion tunnel. The packet may be forwarded to the destination device via a destination service insertion tunnel. The destination service insertion tunnel may be associated with the destination device in the service insertion address table.

10 Claims, 7 Drawing Sheets

(56) References Cited

U.S. PATENT DOCUMENTS

| | | | |
|---|---|---|---|
| 8,165,038 B2 | 4/2012 | Shaw et al. | |
| 8,391,286 B2 | 3/2013 | Gallatin et al. | |
| 2004/0215758 A1* | 10/2004 | Kompella | H04L 41/00 709/223 |
| 2006/0067317 A1* | 3/2006 | Engstrand | H04L 12/2898 370/389 |
| 2007/0177505 A1* | 8/2007 | Charrua | H04L 45/12 370/230 |
| 2008/0259924 A1* | 10/2008 | Gooch | H04L 12/4633 370/392 |
| 2013/0212297 A1 | 8/2013 | Varga | |
| 2013/0318243 A1 | 11/2013 | Chinthalapati et al. | |
| 2014/0241349 A1 | 8/2014 | Yoon et al. | |
| 2014/0286336 A1 | 9/2014 | Narayanan et al. | |
| 2014/0301396 A1* | 10/2014 | Hong | H04L 49/25 370/392 |
| 2014/0328350 A1 | 11/2014 | Hao et al. | |
| 2015/0110111 A1* | 4/2015 | Song | H04L 12/6418 370/392 |
| 2016/0352538 A1* | 12/2016 | Chiu | H04L 12/6418 |

OTHER PUBLICATIONS

Hewlett-Packard Development Company, L.P., "HP Service Insertion Guide Wired Switches K/KA/WB 15.15," Apr. 2014, pp. 1-30, Edition: 1, HP Part No. 5998-5708.

International Search Report and Written Opinion, International Application No. PCT/US2014/068027, dated Aug. 20, 2015, pp. 1-9, KIPO.

Tom Hollingsworth, "IPv6 Transition: Cisco LISP Vs. Tunnel Services," Aug. 8, 2013 [online[, pp. 1-3, Retrieved on Oct. 14, 2014 from the Internet: <http://www.networkcomputing.com/networking/ipv6-transition-cisco-lisp-vs-tunnel-services/a/d-id/1234346?>.

* cited by examiner

SERVICE INSERTION FORWARDING

BACKGROUND

When a network grows large enough, it becomes useful to centralize certain network resources. The resources may then be shared between assets within the network (e.g., network devices), which may be more efficient than the assets individually performing the tasks assigned to the centralized resources. In various examples, these centralized resources may perform a variety of functions relating to, encryption, software defined network control, proxy services, quality of service, law enforcement, logging, and so forth. One technique for providing access to these types of shared resources is known as service insertion.

One example service insertion model begins with a packet entering a network. In various examples, the packet may enter the network at a networking device (e.g., switch, router, wireless access point). The packet may enter the network from, for example, an external source, a source inside of the network, and so forth. At this point, instead of forwarding the packet towards its ultimate destination, the networking device may forward the packet via a service insertion tunnel to a device that performs an inserted service. After the inserted service has been performed, the packet may be returned to the networking device via the reverse path of the service insertion tunnel so the packet may continue on its path to its ultimate destination. Consequently, the inserted service appears to operate as if it were performed by the networking device originating the service insertion tunnel, instead of at a device performing the inserted service.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Systems and methods associated with service insertion forwarding are described. Service insertion forwarding may be achieved by building a service insertion address table that associates devices with service insertion tunnels. The service insertion address table may eliminate some redundant actions that may be taken by networks performing service insertion without the service insertion address table. The service insertion address table may be maintained by, for example, a service providing device. Consequently, when a packet is received by the service providing device from a first device via a service insertion tunnel, the service providing device may associate the first device with the service insertion tunnel in the service insertion address table. Subsequently, when a packet received at the service providing device indicates its payload destination is the first device, the service providing device may forward the packet directly to the first device using the service insertion tunnel.

Thus, systems and methods may include maintaining an address table in a service insertion environment. This is different from some service insertion techniques that include marking a packet exiting a service insertion tunnel with that service insertion tunnel at a service providing device, and returning the packets to that service insertion tunnel upon completion of the inserted service. Consequently, maintaining a service insertion address table may facilitate reducing redundant network traffic and redundant operation of the inserted service.

For ease of explanation, some example systems and methods may be described in a manner that implies that the service providing device is also the device in a network that builds and maintains the service insertion address table and performs various forwarding functions described herein. However, in various examples, the service insertion address table may be maintained by another device within the network depending on the configuration and capabilities of the devices within the network.

For example, a switch or other networking device (e.g., a router) may be configured to be the endpoint of service insertion tunnels. Thus, in this example, the switch may maintain the service insertion address table, transmit packets to the service providing device, and later handle the forwarding of packets received back from the service providing device. In another example, a server may maintain the service insertion address table. The server may perform a load balancing function to distribute packets between several service providing devices providing a similar service, mirror the packet to several service providing devices providing differing services, and so forth. In these examples, the server may serve as the endpoint of service insertion tunnels, maintain service insertion address tables, and perform various other functions described herein.

Figure 1:
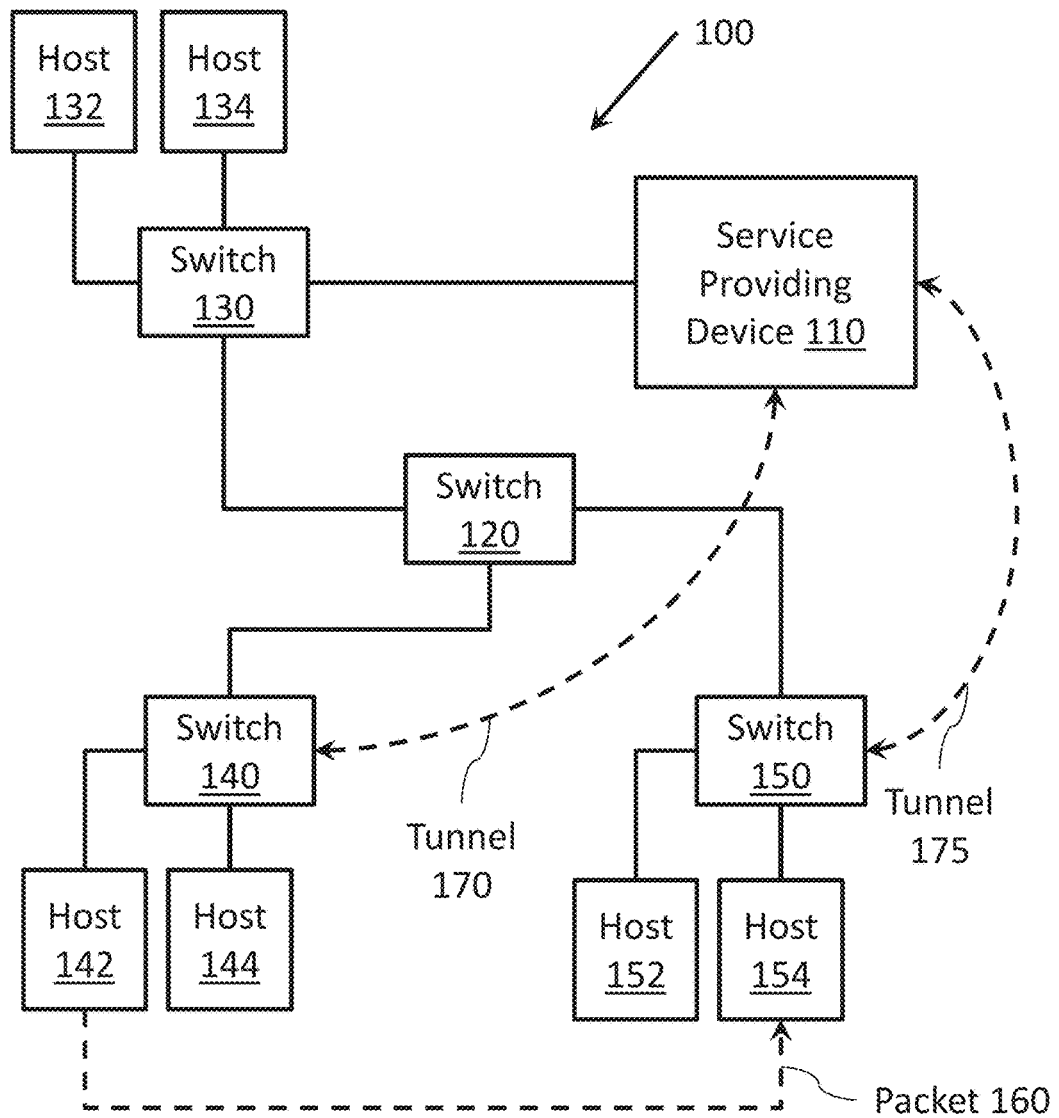
FIG. 1 illustrates an example network in which example systems and methods, and equivalents may operate.

FIG. 1 illustrates an example network 100 in which example systems and methods, and equivalents may operate. It should be appreciated that the network 100 is an illustrative example and that systems and methods, and equivalents, may operate in various network environments using a variety of technologies and configurations.

Network 100 includes a service providing device 110. Service providing device 110 may be configured to perform a number of service insertion functions for network 100. In one example, service providing device 110 may be a specialized device configured to perform a task more efficiently than a general purpose device. Consequently, service providing device 110 may have hardware, software, firmware, and so forth, specifically designed for performing one or more service insertion functions.

Service insertion functions may include, for example, encryption, software defined network control, proxy services, quality of service management, logging, packet inspection, and so forth. By way of illustration, service providing device 110 may be, for example, an intrusion prevention system (IPS) that monitors traffic of network 100 for malicious activity. By centralizing the functionality of the IPS into a single device or set of devices, the burden of monitoring traffic passing through network 100 may be offloaded from other devices within network 100. In another example, service providing device 110 may perform encryption and/or decryption facilitating, for example, a private network. By way of illustration, packets transmitted from network 100 to a remote portion of the private network may be encrypted by service providing device 110 and decrypted at a corresponding service providing device at the remote portion of the private network. As mentioned, depending on the size and/or configuration of network 100, it may be more efficient for a specialized device (e.g., service providing device 110) to perform one or more service insertion functions, rather than an unspecialized device in network 100 (e.g., a host, a switch), or every device.

Network 100 also includes several switches, 120, 130, 140, and 150. In this example, the switches may indicate devices whose primary purpose is to perform routing and/or switching functions within network 100 (e.g., routers, bridges, switches). In this example, switch 120 is an interior switch connected solely to other switches 130, 140, and 150. Switches 130, 140, and 150 may be referred to as edge switches, as they border sources and/or destinations of traffic within network 100, illustrated as hosts 132, 134, 142, 144, 152, and 154.

In some configurations of network 100, it may be desirable to ensure that all packets transmitted through network 100 are processed at some point by service providing device 110. Consequently, edge switches may be configured to tunnel packets passing from a host to a switch or from a switch to a host to service providing device 110. This may ensure that packets that terminate at, or originate from switches are also processed by service providing device 110. In other configurations of network 100, a subset of packets transmitted through network 100 may be processed by service providing device 110. In these configurations, packets may be selectively tunneled to service providing device 110 based on, for example, the inserted service provided by service providing device 110, packet attributes, random selection, and so forth.

As mentioned above, in network 100, the sources and/or destinations of network traffic are illustrated as hosts 132, 134, 142, 144, 152, and 154. Hosts may be, for example, personal computers, servers, printers, network-attached-storage, connections between network 100 and other networks, and so forth. As illustrated, in addition to switch 120, switch 130 is connected to hosts 132 and 134, and service providing device 110. Switch 140 is connected to hosts 142 and 144, and switch 150 is connected to hosts 152 and 154. It should be appreciated that the lines illustrated in network 100 may not indicate direct connections between devices. For example, it is possible that other devices may operate between hosts and switches, switches, and switches, and so forth. These other devices may or may not be a part of network 100, as network 100 may be a private network that spans remote devices connected across the Internet.

Consider a scenario where host 142 seeks to send a packet 160 to host 154. Without service insertion, packet 160 would travel from host 142, to switch 140, to switch 120, to switch 150, and finally arrive at host 154. When network 100 incorporates a technology using service insertion, the packet 160, upon arriving at switch 140, will be sent via tunnel 170 to service providing device 110. This path effectively routes packet 160 from host 142, to switch 140, to switch 120, to switch 130, and finally to service providing device 110. Service providing device 110 may then perform its service insertion function on packet 160, at which point service providing device may return packet 160 to tunnel 170 to return packet 160 to its original path. Consequently, this may cause packet 160 to travel from service providing device 110, back to switch 140 via switches 130 and 120. Upon unpacking packet 160 from the tunnel, switch 140 may place packet 160 back into its original path towards host 154 via switches 120 and 150.

However, because packet 160 has once again reached an edge switch 150, packet 160 may be once again forwarded to service providing device 110, this time via service insertion tunnel 175. Service insertion tunnel 175 routes packet 160 to service providing device 110 from switch 150 via switches 120 and 130, at which point service providing device may once again process packet 160 before returning packet 160 to tunnel 175. At this point packet 160 will travel from service providing device 110 back to switch 150 via switches 130 and 120, at which point packet 160 may finally be forwarded from switch 150 to its destination, host 154. As can be seen, if service providing device 110 operates without a service insertion address table, the transmission of packet 160 from host 142 to host 154 may involve unnecessary network traffic and redundant operation of service providing device 110.

Further, though service providing device 110 could in theory transmit packet 160 directly to host 154 after processing packet 160, in practice, various networking conventions make this impractical. For example, service providing device 110 cannot transmit packet 160 to host 154 with the address of service providing device 110 as the packet source address. This would overwrite the source address of host 142 in packet 160, causing responses to packet 160 to be incorrectly transmitted to service providing device 110 instead of host 142. Additionally, many networks are configured to drop packets having spoofed source addresses because spoofing source addresses is a tactic used by certain forms of malicious traffic. Consequently, service providing device 110 transmitting packet 160 to 154 with the address of host 142 in the source address field of packet 160 may cause packet 160 to be dropped by network 100.

These issues may be mitigated by service providing device 110 maintaining a service insertion address table. In this case, when host 142 attempts to transmit packet 160 to host 154, switch 140 will once again initially place packet 160 into tunnel 170. As before, this will cause packet 160 to be transmitted to service providing device 110 via switches 120 and 130. However, when service providing device 110 maintains an address table, after processing packet 160, service providing device 110 may examine packet 160 to determine the payload destination of packet 160, which in this example is host 154. Service providing device 110 may then look for host 154 is in the service insertion address table maintained by service providing device 110, to see whether host 154 can be reached via its own service insertion tunnel. Assuming that host 154 has previously transmitted a packet across network 100 that was tunneled from switch 150 to service providing device 110 via tunnel 175, the relationship between host 154 and tunnel 175 may be retrieved from the service insertion address table. This relationship may allow service providing device 110 to place packet 160 into tunnel 175 causing packet 160 to be transmitted to switch 150 via switches 130 and 120. At this point, switch 150 may transmit packet 160 directly to host 154.

Tunneling packet 160 from service providing device 110 to switch 150 may ensure preservation of addressing information of packet 160, including the fact that the source of packet 160 was host 142. In addition to preserving addressing information, network traffic may be reduced. Specifically, the transmissions of packet 160 from service providing device 110 to switch 140 via tunnel 170, the transmission of packet 160 from switch 140 to switch 150, and the transmission of packet from switch 150 to service providing device 110 via tunnel 175 may be avoided. Further because switch 150 may recognize that packet 160 arrived from service providing device 110 via tunnel 175, switch 150 may determine that the service providing device 110 has already processed packet 160 and forward packet 160 directly to host 154, potentially eliminating redundant processing of packet 160 by service providing device 110.

In some cases, service providing device 110 may not yet have received a packet from host 154 via tunnel 175 when service providing device 110 receives packet 160 from host 142 via tunnel 170. In this case, when service providing device 110 examines its service insertion address table for host 154, no entry for host 154 may appear in the service insertion address table. In this scenario, service providing device 110 may return the packet to tunnel 170, causing the packet to be returned to switch 140, where the packet may be transmitted through network 100 as though service providing device 110 maintained no service insertion address table. In one example, when the packet reaches switch 150, which borders host 154, packet 160 may be forwarded to service providing device 110 via tunnel 175. At this point host 154 may become associated with tunnel 175 in the service insertion address table maintained by service providing device 110. In another example, host 154 may become associated with tunnel 175 when host 154 responds to packet 160 (e.g., with an acknowledgement packet), and the response packet is sent to service providing device 110 via tunnel 175.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

Figure 2:
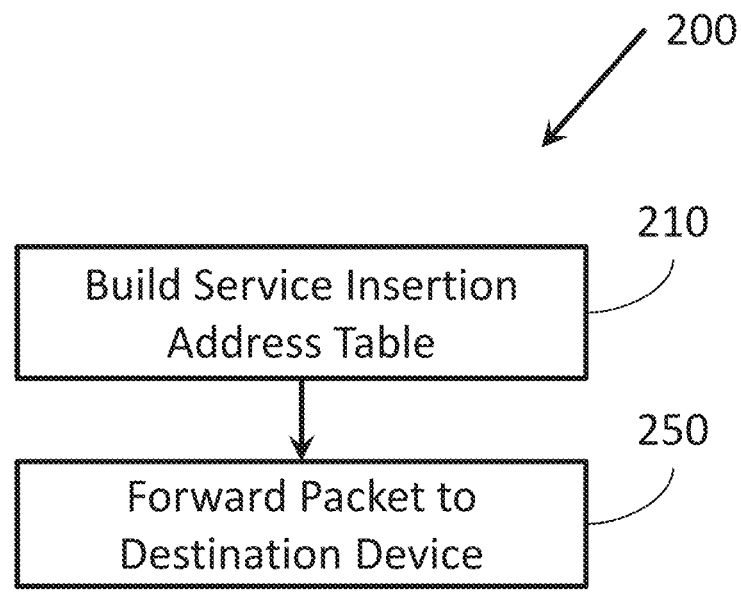
FIG. 2 illustrates a flowchart of example operations associated with service insertion forwarding.

FIG. 2 illustrates a method 200 associated with service insertion forwarding. Method 200 may be embodied on a non-transitory computer-readable medium storing computer-executable instructions. The instructions, when executed by a computer may cause the computer to perform method 200. In other examples, method 200 may exist within logic gates and/or RAM of an application specific integrated circuit (ASIC), field programmable gate array (FPGA), and/or other hardware. Method 200 includes building a service insertion address table at 210. The service insertion address table may associate service insertion tunnels with device addresses. The device addresses may be, for example, media access control (MAC) addresses, internet protocol (IP) addresses, and so forth.

In one example, the combination of a service insertion tunnel and a device address in the service insertion address table may also indicate when that service insertion tunnel originates from a client device, an uplink device, a downlink device and so forth. This may be useful when knowledge of the network topology is available to an entity performing method 200. By way of illustration, if the entity knows that a device address itself is associated with the origin point of a service insertion tunnel, the entity may treat the service insertion tunnel as being associated with a client device. If the origin point of a service insertion tunnel is a device that is at an entry point to the network from which traffic from the device would arrive, the service insertion tunnel may be treated as being associated with an uplink device. If the service insertion tunnel is a device at another place within the network, the service insertion tunnel may be considered associated with a downlink device. This information may be carried to a device maintaining the service insertion address table within, for example, tunnel encapsulation information used to forward packets to the device maintaining the service insertion address table. Knowing whether a service insertion tunnel is associated with a client device, an uplink device, and a downlink device may be useful for determining when to store and/or overwrite a device address/service insertion tunnel pairing in the service insertion address table. By way of illustration, more direct tunnels to devices may be preferred, so the service insertion address table may be configured to only store pairings associated with client devices. In this case, pairings associated with uplink and downlink devices, which often indicates that a device is merely communicating through a downlink device, may be omitted from the service insertion address table.

In one example, a service insertion tunnel may be identified by an address of a tunneling device. The tunneling device serves as an end point of a service insertion tunnel between a device storing the service insertion address table and a device that corresponds to the service insertion tunnel as indicated by the service insertion address table. The service insertion tunnels and device addresses may be associated by reading payload source addresses. The payload source addresses may be retrieved from packets received via the service insertion tunnels. Consequently, when a transmitting device first transmits a packet that reaches the device maintaining the service insertion address table via a service insertion tunnel, the service insertion tunnel and the address of the transmitting device may be associated in the service insertion address table for later retrieval. In one example the service insertion address table may prioritize storing tunnel information that will cause packets to be routed via more direct routes to their ultimate destination. Consequently, when service insertion tunnel is indicated by a packet as a direct route to a device originating the packet, the service insertion address table may prioritize storing an association between that service insertion tunnel and that device. Subsequent packets retrieved from the transmitting device may be periodically checked to ensure the service insertion tunnel with which the transmitting device is associated in the service insertion address table is accurate and/or up to date. However, if the packet is tunneled to the device maintaining the service insertion address table from other parts of the network, the table may not be updated. By way of illustration, referring to FIG. 1, if packet 160 is tunneled to service providing device 110 via tunnel 175, switch 150 may indicate to service providing device 110 (e.g., within tunnel encapsulation information) that host 142, the source device of packet 160, is not local to switch 150. Consequently, service providing device 110 may not update its service insertion address table.

Method 200 also includes forwarding a packet to a destination device at 250. The packet may have been received from a source device via a source service insertion tunnel. The packet may be forwarded to the destination device via a destination service insertion tunnel. The packet may be forwarded to the destination device when the destination device is associated with a service insertion tunnel in the service insertion address table. In one example, the destination device may be associated with the service insertion tunnel by associating the address of the destination device with the service insertion tunnel.

Figure 3:
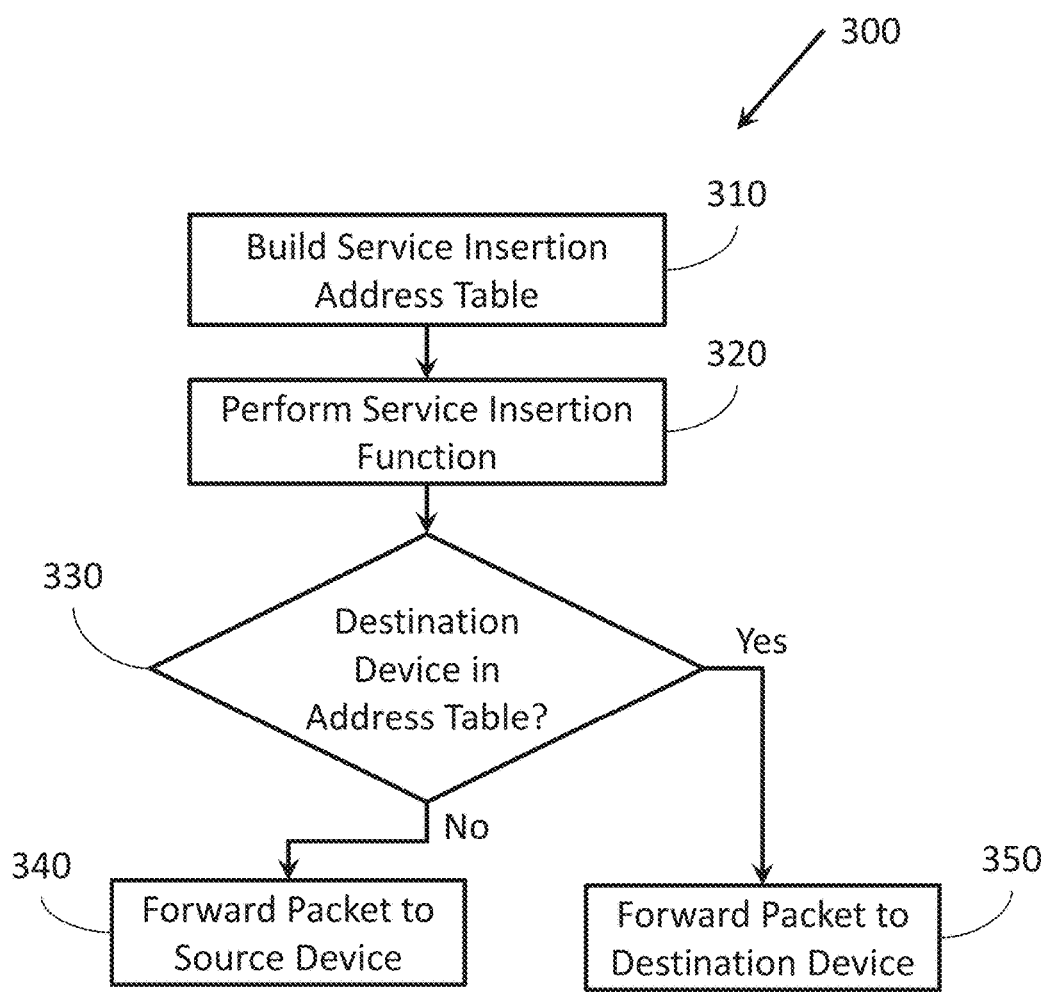
FIG. 3 illustrates another flowchart of example operations associated with service insertion forwarding.

FIG. 3 illustrates a method 300 associated with service insertion forwarding. Method 300 includes several actions similar to those described above with reference to method 200 (FIG. 2). For example, method 300 includes building a service insertion address table at 310, and forwarding a packet received via a source service insertion tunnel to a destination device at 350.

Method 300 also includes performing a service insertion function at 320. The service insertion function may be, for example, a security function, an encryption function, a software defined network control function, a proxy operation, a quality of service computation, a law enforcement function, a logging function, and so forth. In some scenarios, multiple service insertion functions may be performed. In one example, a single device may both manage the service insertion address table and perform the service insertion function. In another example, a device managing the service insertion address table may forward packets received via service insertion tables to a device performing the service insertion function. In this case, the device managing the service insertion address table may wait for a signal from the device performing the service insertion function before performing other actions associated with method 300. This signal may include the packet being returned by the service insertion function to the device managing the service insertion address table.

Method 300 also includes determining whether the destination device is listed in the service insertion address table at 330. When the destination device is associated with a service insertion tunnel in the service insertion address table, method 300 may proceed to forwarding the packet to the destination device at 350 as described above. The packet may be forwarded to the destination device at 350 by placing the packet into the service insertion tunnel that the destination device is associated with in the service insertion address table.

When the destination device not is associated with a service insertion tunnel in the service insertion address table, the packet may instead be forwarded back to the source device at 340. The packet may be forwarded back to the source device at 340 via the source service insertion tunnel. In one example, if the packet received from the source device is the first packet that has been received from the source device via the source service insertion tunnel, it may be appropriate to associate the source device and the source service insertion tunnel in the service insertion address table prior to forwarding the packet on to the service insertion function. If the service insertion address table contains neither an address for the destination device nor an address for the source device, the packet may be returned to the service insertion tunnel at which the packet arrived at the service insertion device. If that service insertion tunnel also cannot be determined, the packet may be dropped by the service insertion device.

Figure 4:
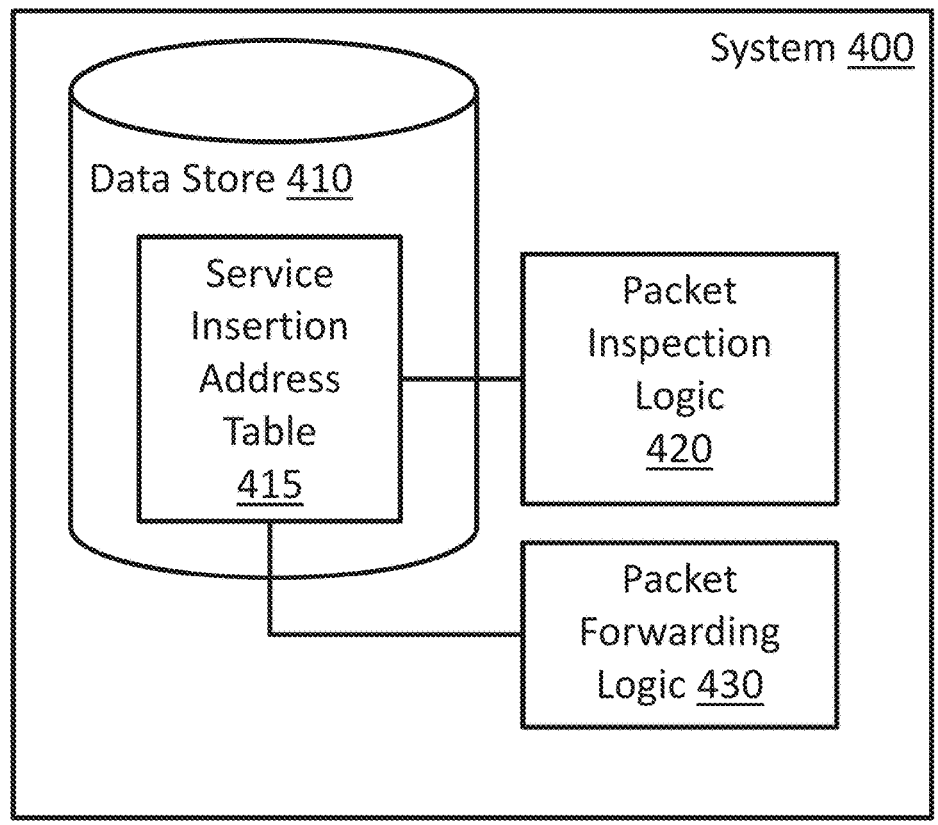
FIG. 4 illustrates an example system associated with service insertion forwarding.

FIG. 4 illustrates a system 400 associated with service insertion forwarding. System 400 includes a data store 410. Data store 410 stores a service insertion address table 415. Service insertion address table 415 may associate service insertion tunnels with device addresses. Device addresses may be, for example, media access control (MAC) addresses, internet protocol (IP) addresses, and so forth. Additionally, the combination of a service insertion tunnel and a device address in the service insertion address table may also indicate when a device is a client device, an uplink device, a downlink device, and/or other relevant attributes of devices. Service insertion tunnels may be indicated in service insertion address table 415, for example, by addresses of networking devices that originate and/or terminate the service insertion tunnels.

System 400 also includes a packet inspection logic 420. Packet inspection logic 420 may identify a packet payload source address and a packet payload destination address from a packet received from a first service insertion tunnel. When the first service insertion tunnel and/or the packet payload source address are absent from the service insertion address table, and encapsulation information for the packet indicates the service insertion tunnel is directly associated with the source address packet inspection logic 420 may associate the packet payload source address and the first service insertion tunnel in service insertion address table 415. Additionally, when the first service insertion tunnel differs from a service insertion tunnel associated with the packet payload source address in service insertion address table 415, and encapsulation information for the packet indicates that the service insertion tunnel is directly associated with the source address, packet inspection logic 420 may also associate the packet payload source address and the first service insertion tunnel in service insertion address table. However, this updating may depend on a status of the device/tunnel pairing in the service insertion address table. For example, if the packet payload source address is identified as associated with an uplink from the first service insertion tunnel, then the packet payload source address in the service insertion address table may not be added or updated.

System 400 also includes a packet forwarding logic 430. Packet forwarding logic 430 may place the packet into a second service insertion tunnel when second service insertion tunnel is associated with the packet payload destination address in service insertion address table 415. When the packet payload destination address is absent from service insertion address table 415, packet forwarding logic 430 may place the packet into the first service insertion tunnel to return the packet to the first device.

In one example system 400 may operate on a device performing a service insertion function. In another example, system 400 may be incorporated into a switch operating between a device associated with the packet payload source address and a device performing a service insertion function. The switch may be, for example, a bridge, a router, or other networking device that routes packets within a network. Placing the system 400 on a switch as opposed to a device performing a service insertion task may facilitate, for example, load balancing packets received via service insertion tunnels over multiple devices performing a similar service insertion task, and so forth.

Figure 5:
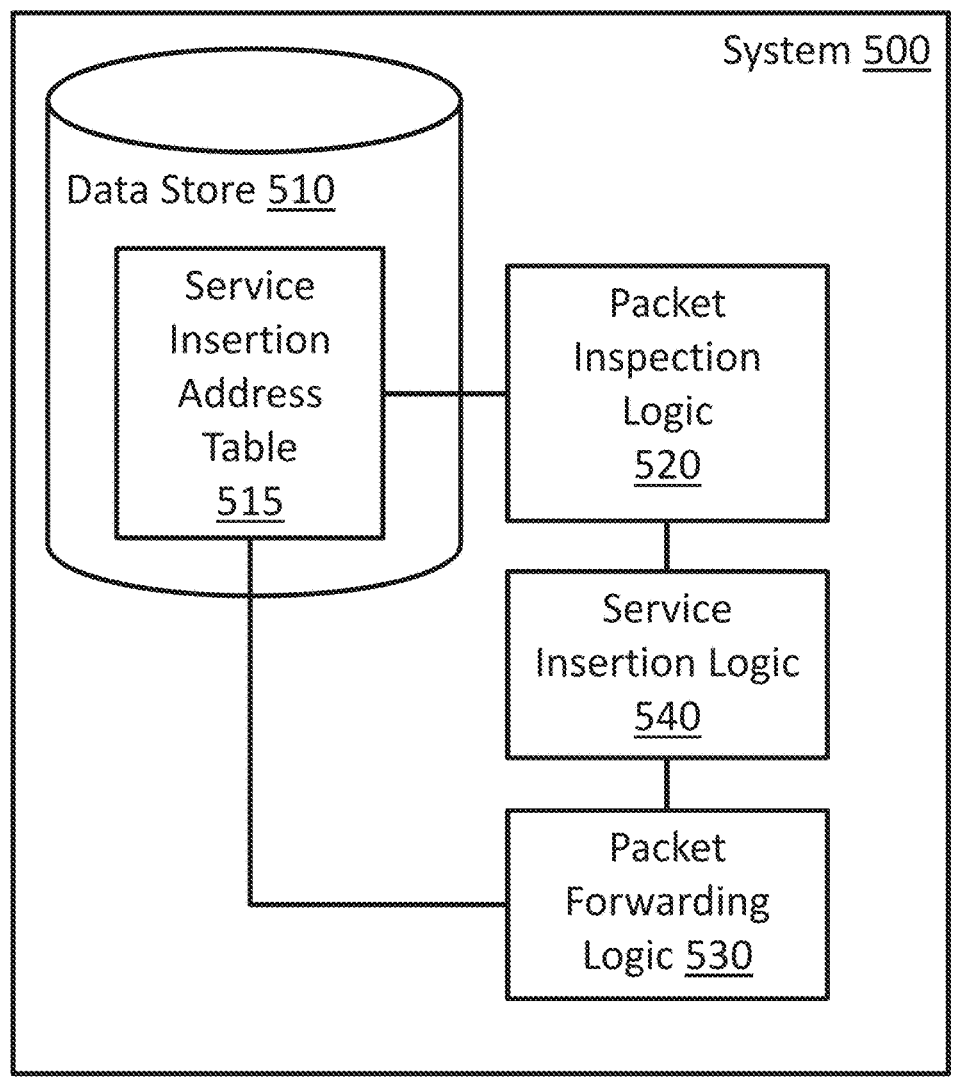
FIG. 5 illustrates another example system associated with service insertion forwarding.

FIG. 5 illustrates a system 500 associated with service insertion forwarding. System 500 includes several items similar to those described above with reference to system 400 (FIG. 4). For example, system 500 includes a data store 510 containing a service insertion address table 515, a packet inspection logic 520 to identify a packet payload source address and a packet payload destination address from a packet received from a first service insertion tunnel, and a packet forwarding logic 530.

System 500 also includes a service insertion logic 540. Service insertion logic 540 may perform a service insertion function on the packet. The service insertion function may be, for example, security function, an encryption function, a software defined network control function, a proxy operation, a quality of service computation, a law enforcement function, a logging function, and so forth. In one example, service insertion logic 540 may operate after packet inspection logic 520 has identified the packet payload source address and the packet payload destination address from the packet. In another example, service insertion logic 540 and packet inspection logic 520 may operate in parallel. After completing the service insertion function, service insertion logic 540 may give the packet to packet forwarding logic 530 so that the packet can be transmitted back to a network via an appropriate service insertion tunnel.

Figure 6:
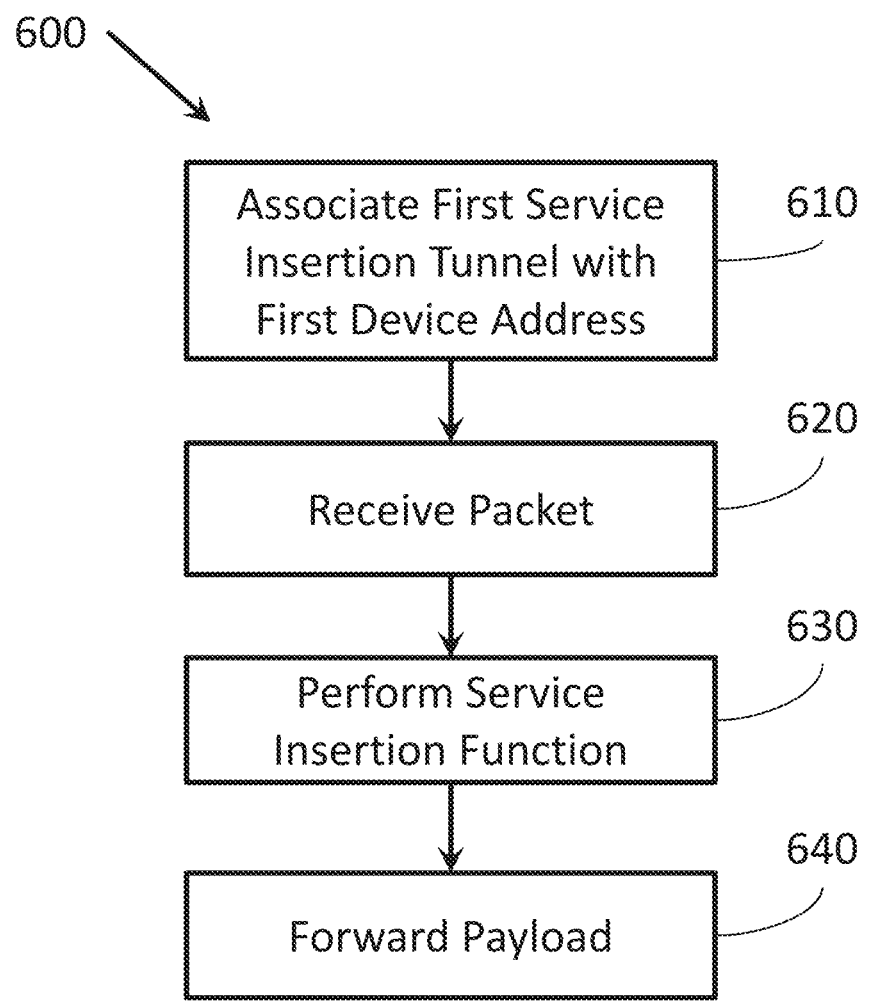
FIG. 6 illustrates another flowchart of example operations associated with service insertion forwarding.

FIG. 6 illustrates a method 600 associated with service insertion forwarding. Method 600 includes associating a first service insertion tunnel with a first device address at 610. The first service insertion tunnel may be associated with the first device address upon receiving a first packet from a first device at the first device address. The first packet may be received from the first device via the first service insertion tunnel.

Method 600 also includes receiving a second packet at 620. The second packet may be received via a second service insertion tunnel. The second packet may be received from a second device having a second device address. The second packet may indicate its destination is the first device. The second packet may indicate its destination is the first device using the first device address (e.g., in a field in the packet header of the second packet).

Method 600 also includes performing a service insertion function on the second packet at 630. As described above, the service insertion function may be, for example, security function, an encryption function, a software defined network control function, a proxy operation, a quality of service computation, a law enforcement function, a logging function, and so forth.

Method 600 also includes forwarding a payload to the first device at 640. The payload may be generated based on the second packet. The payload may be forwarded using the first service insertion tunnel. In one example, the payload may be the second packet. In another example, the service insertion function may modify the second packet, causing the payload to differ from the second packet.

Figure 7:
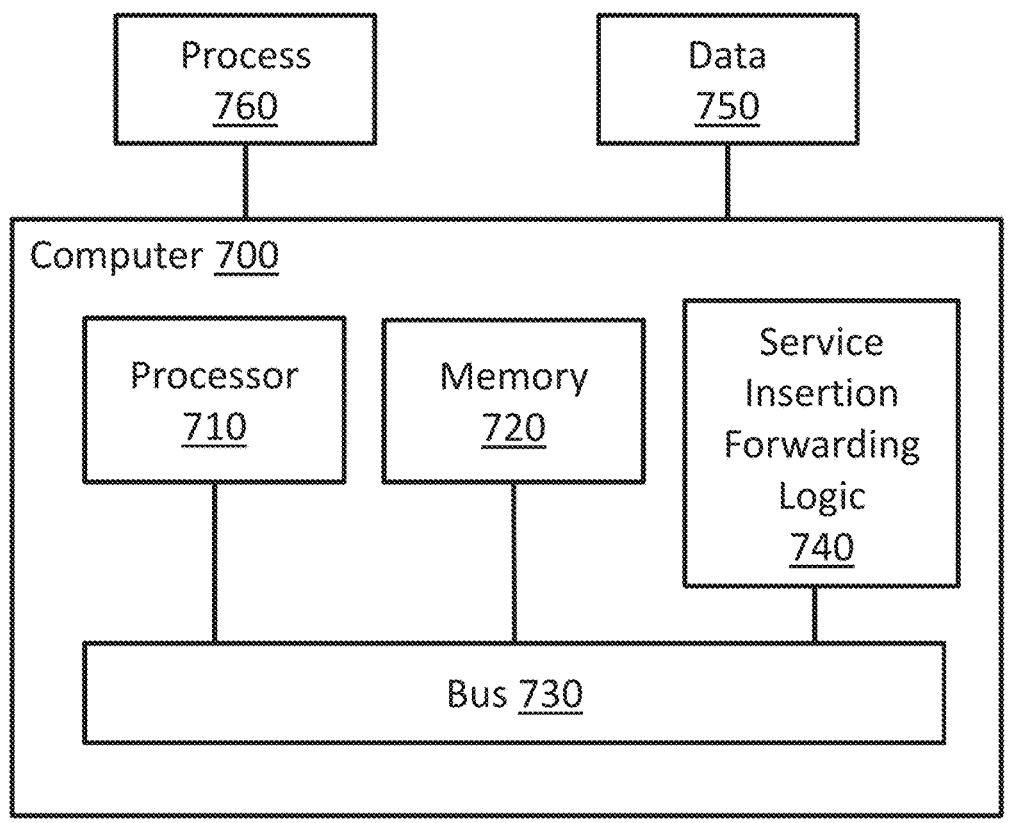
FIG. 7 illustrates an example computing device in which example systems and methods, and equivalents, may operate.

FIG. 7 illustrates an example computing device in which example systems and methods, and equivalents, may operate. The example computing device may be a computer 700 that includes a processor 710 and a memory 720 connected by a bus 730. The computer 700 includes a service insertion forwarding logic 740. In different examples, service insertion forwarding logic 740 may be implemented as a non-transitory computer-readable medium storing computer-executable instructions, in hardware, software, firmware, an application specific integrated circuit, field programmable gate array, and/or combinations thereof.

The instructions may also be presented to computer 700 as data 750 and/or process 760 that are temporarily stored in memory 720 and then executed by processor 710. The processor 710 may be a variety of various processors including dual microprocessor and other multi-processor architectures. Memory 720 may include non-volatile memory (e.g., read only memory) and/or volatile memory (e.g., random access memory). Memory 720 may also be, for example, a magnetic disk drive, a solid state disk drive, a floppy disk drive, a tape drive, a flash memory card, an optical disk, and so on. Thus, memory 720 may store process 760 and/or data 750. Computer 700 may also be associated with other devices including other computers, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A non-transitory computer-readable medium storing computer executable instructions that when executed by a computer system causes the computer system to:
   determine a device address, which is a source address in a payload of a first packet received via a tunnel, wherein the payload is encapsulated with an encapsulation header of the first packet;
   generate an entry in a table that maps an identifier of the tunnel to the device address;
   perform a service insertion function on a second packet received by the computer system;
   determine that a destination address of a payload of the second packet matches the device address by looking up the table;
   select, for the second packet, the tunnel as a forwarding tunnel based on the match; and
   select a second tunnel as a forwarding tunnel for a third packet received via the second tunnel in response to a destination address of a payload of the third packet not matching an address in the table and forward the third packet via the second tunnel.

2. The non-transitory computer-readable medium of claim 1, where the service insertion function is one or more of: a security function, an encryption function, a software defined network control function, a proxy operation, a quality of service computation, a law enforcement function, and a logging function.

3. The non-transitory computer-readable medium of claim 1, where the device address is one or more of: a media access control (MAC) address, and an Internet Protocol (IP) address.

4. The non-transitory computer-readable medium of claim 1, wherein the entry in the table further indicates one or more of: an uplink device and a downlink device.

5. A computer system, comprising:
   a set of processors; and
   a storage device configured to store a table;
   a non-transitory computer-readable medium coupled to the set of processors storing instructions thereon that, when executed by the processors, cause the processors to perform a method, the method comprising:
   determining device address, which is a source address in a payload of a first packet received via a tunnel, wherein the payload is encapsulated with an encapsulation header of the first packet;
   generating an entry in the table that maps an identifier of the tunnel to the device address;
   performing a service insertion function on a second packet received by the computer system;
   determining that a destination address of a payload of the second packet matches the device address by looking up the table;
   selecting, for the second packet, the tunnel as a forwarding tunnel based on the match; and
   selecting a second tunnel as a forwarding tunnel for a third packet received via the second tunnel in response to a destination address of a payload of the third packet not matching an address in the table and forward the third packet via the second tunnel.

6. The computer system of claim 5, where the service insertion function is one or more of: a security function, an encryption function, a software defined network control function, a proxy operation, a quality of service computation, a law enforcement function, and a logging function.

7. The computer system of claim 5, where the device address is one or more of: a media access control (MAC) address, and an Internet Protocol (IP) address.

8. The computer system of claim 5, wherein the entry in the table further indicates one or more of: an uplink device and a downlink device.

9. A method, comprising:
   determining a device address, which is a source address in a payload of a first packet received via a tunnel, wherein the payload is encapsulated with an encapsulation header of the first packet;
   generating an entry in a table that maps an identifier of the tunnel to the device address;
   performing a service insertion function on a second packet;
   determining that a destination address of a payload of the second packet matches the device address by looking up the table;
   selecting, for the second packet, the tunnel as a forwarding tunnel based on the match; and
   selecting a second tunnel as a forwarding tunnel for a third packet received via the second tunnel in response to a destination address of a payload of the third packet not matching an address in the table and forward the third packet via the second tunnel.

10. The method of claim 9, where the service insertion function is one or more of: a security function, an encryption function, a software defined network control function, a proxy operation, a quality of service computation, a law enforcement function, and a logging function.

* * * * *